US012782645B2

(12) United States Patent
Chivers

(10) Patent No.: US 12,782,645 B2
(45) Date of Patent: Nov. 3, 2026

(54) MEASURING ENDFACE GEOMETRY OF FIBER OPTIC CONNECTORS WHILE MOUNTED IN A POLISHING PLATE

(71) Applicant: Direct Optical Research Company, Inc., Largo, FL (US)

(72) Inventor: James Chivers, Belleair Shore, FL (US)

(73) Assignee: Viavi Solutions Licensing, LLC, Chandler, AZ (US)

( * ) Notice: Subject to any disclaimer, the term of this patent is extended or adjusted under 35 U.S.C. 154(b) by 124 days.

(21) Appl. No.: 18/480,223

(22) Filed: Oct. 3, 2023

(65) Prior Publication Data

US 2025/0110287 A1 Apr. 3, 2025

(51) Int. Cl.
*G02B 6/38* (2006.01)
*G02B 6/36* (2006.01)

(52) U.S. Cl.
CPC ........... *G02B 6/385* (2013.01); *G02B 6/3616* (2013.01); *G02B 6/3831* (2013.01); *G02B 6/3843* (2013.01)

(58) Field of Classification Search
CPC .... G02B 6/385; G02B 6/3616; G02B 6/3843; G02B 6/3863; G02B 6/3648
See application file for complete search history.

(56) References Cited

U.S. PATENT DOCUMENTS 7,801,407 B2 * 9/2010 Koudelka ............ G01M 11/331 356/73.1
9,014,528 B1 * 4/2015 Chivers ................ G02B 6/3843 356/73.1
2006/0147160 A1 * 7/2006 Schmidt ................. G02B 6/381 385/85

OTHER PUBLICATIONS

"Database" Merriam-Webster.com Dictionary, https://www.merriam-webster.com/dictionary/database. Archived Apr. 27, 2021. (Year: 2021).*
R. Paschotta, article on 'Michelson Interferometers' in the RP Photonics Encyclopedia, archived Jul. 5, 2022 (Year: 2022).*

* cited by examiner

*Primary Examiner* — Tarifur R Chowdhury
*Assistant Examiner* — Paul Schnase
(74) *Attorney, Agent, or Firm* — Lewellyn Law, PLLC; Stephen Lewellyn

(57) ABSTRACT

Embodiments of the present disclosure provide systems, methods, and devices for measuring the endface geometry of optical fiber connector ferrules while attached to an optical fiber ferrule polishing holder, thereby eliminating the need to remove each ferrule from the holder for inspection and measurement. An embodiment has a polishing holder having a reference surface in a location to be imaged by an optical imaging device. The reference surface may be used to create spatial data about the holder such as XY tilt data that can later be used in accurately measuring the endfaces of the ferrules without requiring the ferrules to be removed from the holder.

20 Claims, 12 Drawing Sheets

MEASURING ENDFACE GEOMETRY OF FIBER OPTIC CONNECTORS WHILE MOUNTED IN A POLISHING PLATE

TECHNICAL FIELD

The present disclosure relates to measuring the endface geometry of fiber optic connectors.

BACKGROUND

A fiber optic connector is a specialized device used to mate or terminate the ends of optical fibers in a fiber optic communication system. It enables the efficient transfer of data and information using light pulses traveling through the thin strands of glass or plastic known as optical fibers. Fiber optic connectors are crucial components in modern communication networks, such as telecommunications, internet, and data transmission systems.

The end face geometry of a fiber optic connector refers to the physical characteristics and shape of the connector's polished surface where the fiber terminates and contacts another fiber or optical device. It is crucial to ensure proper alignment, efficient light transmission, and minimal signal loss in optical communication systems.

A key aspect of endface geometry is fiber core alignment and insuring physical contact with a mating fiber. For example, in physical contact (PC) connectors, the fibers are in direct physical contact, and both the ferrules of the connectors and the fiber end faces are slightly curved to maintain physical contact during mating. Ultra physical contact (UPC) connectors have a finer polished surface, resulting in an improved physical contact with even lower loss. Angled physical contact (APC) connectors typically have an 8-degree angle on the end face to minimize back reflections. They are commonly used in applications where low back reflection is critical.

Polishing an optical fiber connector's end face geometry is a critical step in ensuring efficient light transmission and reducing signal loss in fiber optic communication systems. The polishing process is typically carried out using a specialized polishing machine. This machine consists of a rotating polishing plate covered with a polishing pad or film. Usually, multiple connectors are held securely in a polishing plate that allows precise control over the polishing angle and pressure.

Once polished, it is essential to inspect the connector's endface using a 2D imaging microscope or a specialized 3D imaging inspection tool, such as an interferometer. The endface geometry must meet specific industry standards for radius of curvature, apex offset, and fiber height. Once the polishing is completed, the connector is thoroughly cleaned to remove any polishing residue. Then inspection and testing are performed to ensure the endface meets the required geometry specifications and surface finish.

Conventionally, each connector is removed from the polish plate for cleaning and inspection and testing. If a connector fails inspection or testing it is typically returned to the polishing plate for further polishing after which the connector is once again removed from the polishing plate for cleaning and inspection and testing. This repetitious process is time consuming and risks damaging the fragile optical endface as the connector is moved between equipment during manufacturing.

An attempt to solve this problem is described by Koudelka et al. in U.S. Pat. No. 7,801,407. In this patent, Koudelka et al. describes a fixture for holding a polishing plate relative to an interferometer to inspect connectors that are attached to the polishing plate and related methods of use. However, the solution described by Koudelka et al. does not account for critical angular tolerance differences between connector positions on the polishing plate and how those differences result in an inaccurate apex offset measurement for potentially all but one position in the polishing plate.

Particularly, measuring the endface geometry of an optical fiber connector by an interferometer involves knowing the precise angular orientation of the connector relative to the optics of the interferometer so that the optics can by adjusted relative to the connector orientation to accurately inspect and measure the endface geometry. Typically, the optical fiber connector is inserted into to a precision fixture that is rigidly attached to the interferometer to position the endface in alignment with the interferometer optics, such as described in U.S. Pat. No. 5,459,564, the entirety of which is incorporated herein by reference. The optical alignment of the fixture and thus the optical alignment of the connector inserted in the fixture is constant—as the fixture is rigidly attached to the interferometer. This allows the fixture to be precisely calibrated relative to the interferometer's optics, thereby yielding repeatable and accurately calibrated endface geometry measurements for connector end face parameters such as radius of curvature, fiber height, XY angles, and apex offset.

Unlike the single aperture precision fixture described above, polishing plates often contain a dozen or more connector receiving locking apertures and despite precision machining, the perpendicularity of each of these positions is unique, contributing to a slightly different polished XY angle and apex offset from each aperture. Ideally the polished XY angles, usually expressed as an apex offset magnitude, should be zero, and the maximum limit is typically just 50 microns. Given the extremely tight tolerances involved, it is easy to imagine that accurately measuring the endface geometry, such as the apex offset, while the connectors are still mounted in the polishing plate is very challenging.

Therefore, a need remains for a system and/or method to accurately measure the endface geometry of optical fiber connectors while still mounted in the polishing plate.

SUMMARY

The present disclosure provides systems and methods for accurately measuring the endface geometry of the fiberoptic connector or ferrule while still attached to a polishing plate, thereby eliminating the need to remove each fiberoptic connector or ferrule from the plate for inspection and geometry measurement.

In an aspect, an optical fiber ferrule polishing holder or plate is provided. The plate has a body having a top, a bottom, and a plurality of insertion apertures extending therethrough between the top and bottom. Each insertion aperture being configured to removably hold a fiber optic ferrule for polishing. A reference surface is disposed on the body in a location to be imaged by an optical imaging device to determine an XY tilt of the reference surface in relation to an optical axis of the imaging device.

In aspects, the reference surface may be a mirrored surface. In aspects, the plate may have a reference ferrule rigidly attached to the body and the reference ferrule has a reference surface. The reference surface may be disposed in a recess formed in a surface of the plate. In aspects, the holder may have an RFID tag disposed on the body. In aspects, a serial number or machine-readable codes, symbols, or devices could be used to retrieve unique calibration offset data of each aperture in the plate relative to the reference surface.

In an aspect, an optical fiber system has at least one optical fiber ferrule polishing holder having a body. The body has a top, a bottom, and plurality of insertion apertures extending therethrough between the top and bottom. Each insertion aperture is configured to removably hold a fiber optic ferrule for polishing, and a reference surface is disposed on the body. The system further has a database storing spatial data of the at least one optical fiber ferrule polishing holder. The spatial data may include XY reference tilt data of the reference surface and XY aperture tilt data of at least one of the plurality of apertures. The XY reference tilt data includes the XY tilt of the reference surface in relation to a first Z-axis extending through the bottom surface, and the XY aperture tilt data includes the XY tilt of the associated aperture in relation to a second Z-axis extending perpendicular to the reference surface. The spatial data of the at least one optical fiber ferrule polishing holder can be retrieved for measuring at least one endface of a fiber optic ferrule held by the optical fiber ferrule polishing holder.

In an aspect, an optical fiber system has at least one optical fiber ferrule polishing holder having a body. The body has a top, a bottom, and plurality of insertion apertures extending therethrough between the top and bottom. Each insertion aperture being configured to removably hold a fiber optic ferrule for polishing, and a reference surface is disposed on the body. The system may further have a fixture configured to removably hold the optical fiber ferrule polishing holder. The fixture has a Z-axis that extends through the bottom of the body when the optical fiber ferrule polishing holder is held by the fixture. An optical imaging device may be mounted to the fixture for movement in an X-direction and a Y-direction each being perpendicular to the Z-axis. The optical imaging device has an optical axis that intersects the bottom of the body when the optical fiber ferrule polishing holder is held by the fixture.

In aspects, the optical imaging device may be an interferometer. In aspects, the optical imaging device is further mounted for rotation about the Z-axis. In aspects, the system may have a database storing characterization or spatial data of the at least one optical fiber ferrule polishing holder, the characterization data or spatial data including XY reference tilt data of the reference surface and XY aperture tilt data of at least one of the plurality of apertures. The XY reference tilt data includes the XY tilt of the reference surface in relation to a first Z-axis extending through the bottom surface, and the XY aperture tilt data includes the XY tilt of the associated aperture in relation to a second Z-axis extending perpendicular to the reference surface, whereby the characterization or spatial data of the at least one optical fiber ferrule polishing holder can be retrieved for measuring at least one endface of a fiber optic ferrule held by the optical fiber ferrule polishing holder.

In aspects, the database may be a computer database. In aspects, at least one optical fiber ferrule polishing holder further has an RFID tag disposed on the body, and wherein the RFID tag is used to retrieve the characterization or spatial data from the database.

Numerous additional objects, features, and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there are illustrated embodiments of the invention.

DETAILED DESCRIPTION

This description and the accompanying drawings that illustrate inventive aspects, embodiments, implementations, or applications should not be taken as limiting the claims define the protected invention. Various mechanical, structural, and operational changes may be made without departing from the spirit and scope of this description and the claims. In some instances, well-known devices, structures, or techniques have not been shown or described in detail in order not to obscure the invention. Like reference numbers in two or more figures represent the same or similar elements.

Although this description is made to be sufficiently clear, concise, and exact, scrupulous, and exhaustive linguistic precision is not always possible or desirable, since the description should be kept to a reasonable length and skilled readers will understand background and associated technology.

In addition, the singular forms “a”, “an”, and “the” are intended to include the plural forms as well, unless the context indicates otherwise. And the terms “comprises”, “includes”, “has”, and the like specify the presence of stated features, steps, operations, elements, and/or components but do not preclude the presence or addition of one or more other features, steps, operations, elements, components, and/or groups.

Further, specific words chosen to describe one or more embodiments and optional elements or features are not intended to limit the invention. For example, spatially relative terms-such as “beneath”, “below”, “lower”, “above”, “upper”, “proximal”, “distal”, and the like—may be used to describe one element’s or feature’s relationship to another element or feature as illustrated in the figures. These spatially relative terms are intended to encompass different locations (i.e., translational placements) and orientations (i.e., rotational placements) of a device in use or operation in addition to the location and orientation shown in the figures. For example, if a device in the figures is turned over, elements described as “below” or “beneath” other elements or features would then be “above” or “over” the other elements or features. Thus, the exemplary term “below” can encompass both locations and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes include various special device locations and orientations. The combination of a body’s location and orientation defines the body’s pose.

Figure 1:
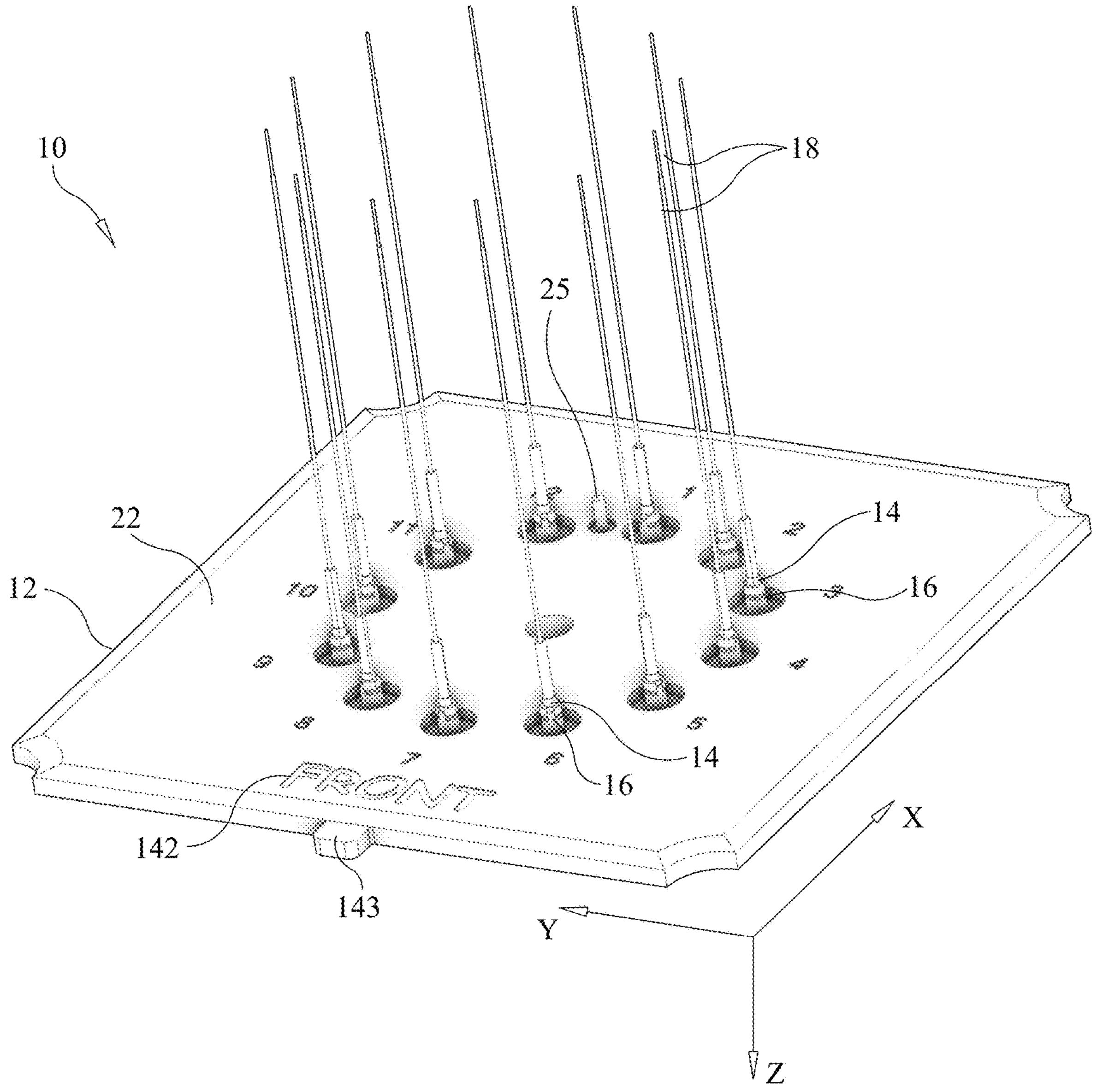
FIG. 1 is a top perspective view of an optical fiber ferrule polishing holder according to at least one embodiment of the invention.
Figure 2:
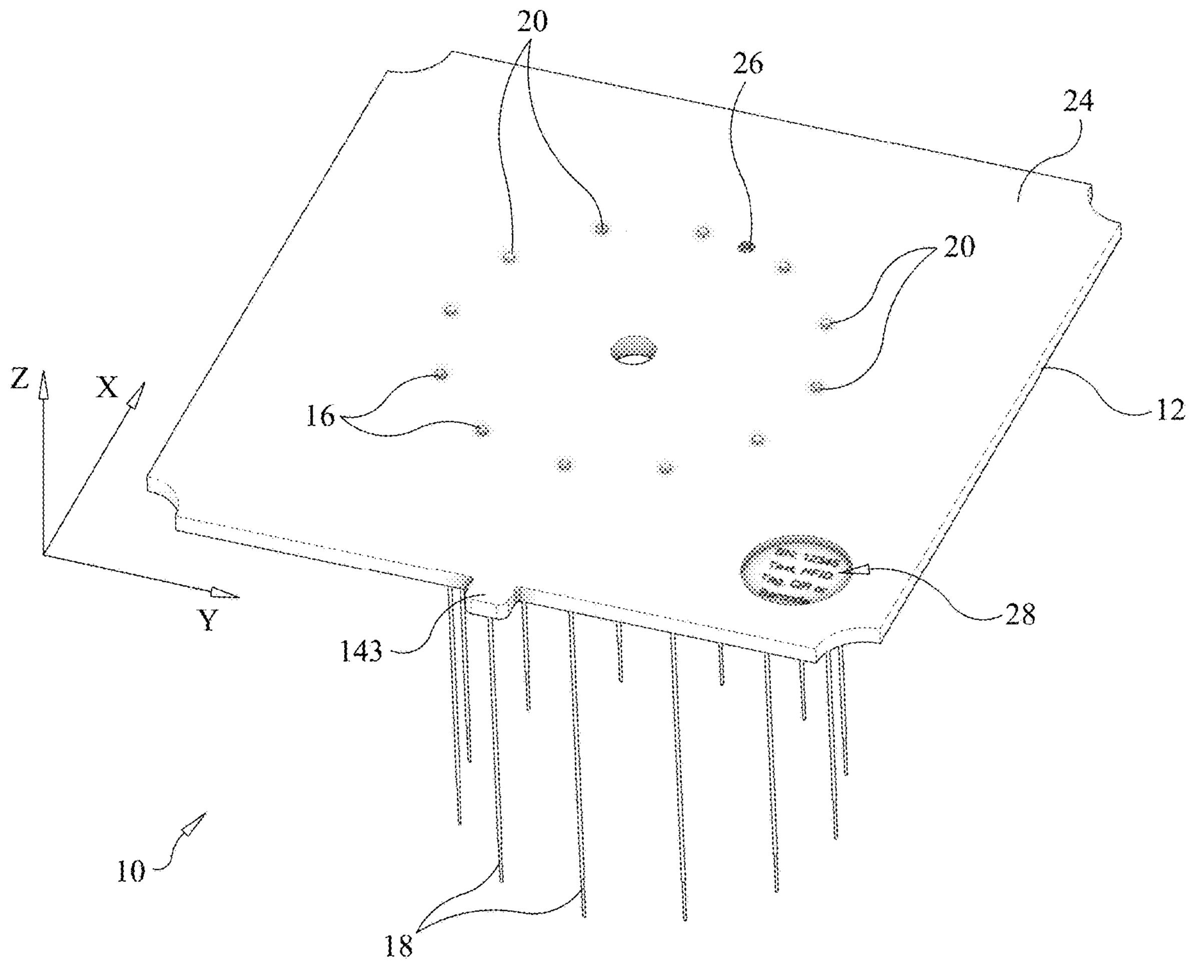
FIG. 2 is a bottom perspective view of the optical fiber ferrule polishing holder.

In FIGS. 1 and 2 there is shown an optical fiber ferrule holder 10 in accordance with at least one embodiment or aspect of the invention. FIG. 1 shows the holder from a top perspective and the holder is shown from a bottom perspective in FIG. 2. Holder 10 has a body 12 that may be plate shaped and which may be referred to herein after as either a body, a plate, or polishing plate. The holder 10 is representatively shown with twelve single fiber Physical Contact (PC) ferrules 14 inserted into respective insertion apertures 16 formed through the plate 12 and spaced radially around a center of the body. Conventionally, polishing holders usually contain a locking or latching mechanism to hold each connector ferrule securely in an insertion aperture, these latching mechanisms are not shown for clarity. Another common configuration orientates each ferrule at an angle of 8-degrees used to create an Angled Physical Contact (APC) connector. The disclosure is not limited to APC or PC type connectors and other connector types and styles could be used in implementing the various embodiments disclosed herein.

As representatively shown in the PC type connector, ferrules 14 having an optical fiber 18 precisely located and secured in the center of the ferrule’s longitudinal axis. It is the ends 20 of these ferrules and associated optical fiber that are polished to create a desired endface geometry and which are subject of this disclosure.

As discussed above, although all the insertion apertures 16 in plate 12 are precisely machined to enable accurate polishing, they are not all perfectly perpendicular to the plate or to each other due to machining tolerances. The spatial geometry of plate 12 and of apertures 16 must be known to accurately measure the endfaces of the optical fibers while they remain attached to the body.

Accordingly, in an aspect of the invention, plate 12 has a top surface (top side) 22 and a bottom surface (bottom side) 24 through which the apertures 16 extend. A reference 26 surface may be disposed on the bottom surface 24 of the plate 12 and the reference surface may be used in determining the spatial orientation of the plate and of each insertion apertures 16 in relation to an optical system of an endface imaging device, such as an interferometer, so that the endfaces of the ferrules can be accurately measured while remaining connected to the body. While the disclosure herein is made in connection with the reference being disposed on the bottom side of the plate 12, it could be located anywhere on the plate and in any position, that would enable the “random” XY tilt orientation in which a random polishing plate is loaded to be accurately determined—even if this required the use of mirror(s) or a separate measurement device to the interferometer itself.

In an aspect, the reference surface 26 may be used to determine the XY Angular Tilt (XY Tilt) of the plate with respect to the optical system of an interferometer when presented to the interferometer. Further, reference surface 26 may be used to determine and measure the perpendicularity or XY Angular Tilt (XY Tilt) of each aperture 16 in relation to the reference surface. The plate XY Tilt, the XY Tilt of each aperture, and the XY and/or radial coordinates of each aperture location on the plate, as well as a unique plate identification can be stored in a computer database. This information can then be retrieved and used to perform accurate calibrated endface geometry measurements on ferrules still mounted in the plate, even though the exact orientation of the polishing plate relative to the interferometer’s optical axis is initially unknown.

Figure 3:
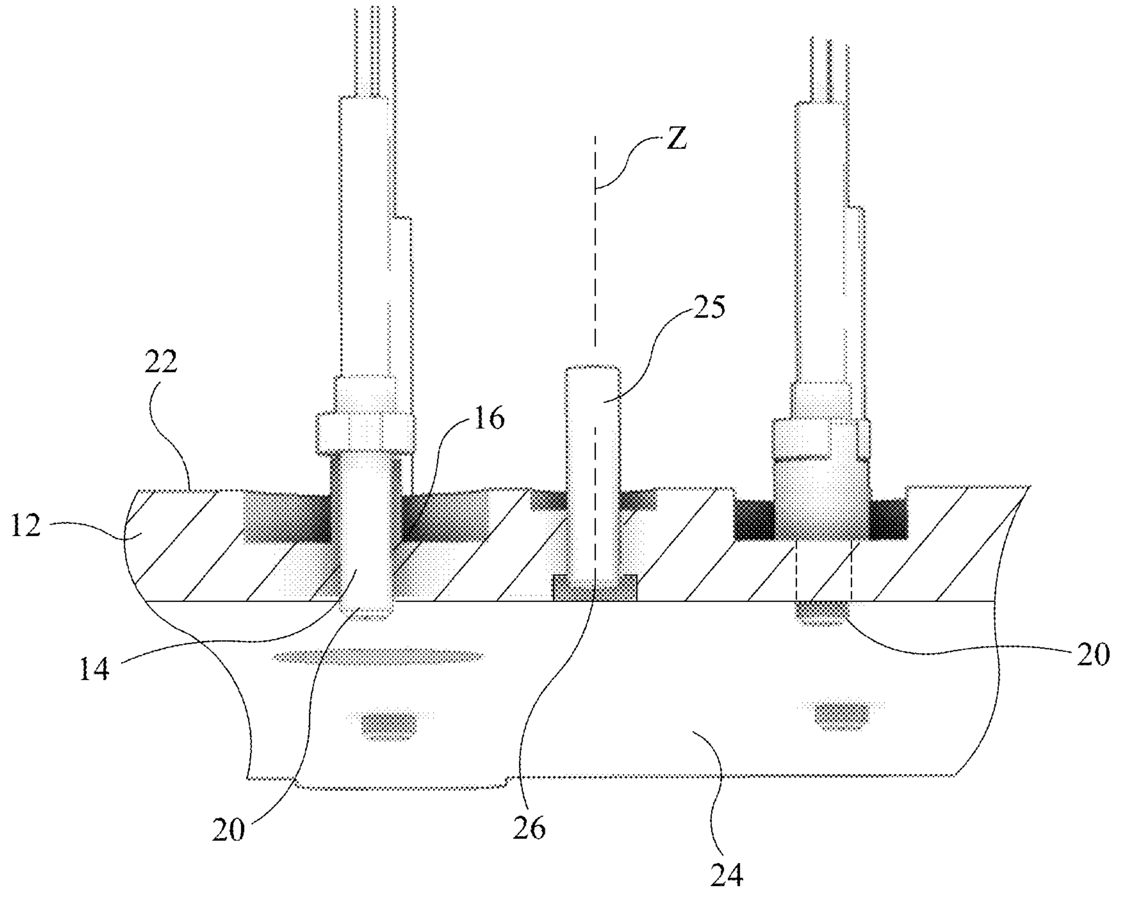
FIG. 3 is a partial cross-section view of the optical fiber ferrule polishing holder.

With additional reference to FIG. 3, in an aspect, the reference surface may be a mirror or a polished ferrule endface 26 of a reference ferrule 25 that is permanently attached or incorporated into the plate. The preferred nominal alignment of reference surface 26 would be parallel with the bottom surface of the polishing plate 12. This reference surface 26 is installed slightly recessed in the bottom surface so there is no possibility of contacting the abrasive polishing platen and become damaged or modified. The location of endface 26 could be anywhere within the XY motion range of an interferometer, such as, for example locating it on the same radius as the circular array of apertures 16 minimizes the time taken to position to this XY location for measurement by the interferometer. If the apertures 16 are arranged in a grid-like array, the endface 26 is located within the XY motion range of interferometer, which may or may not be within the connector grid-like array.

Position 28 is a possible location of a feature used to uniquely identify each polishing plate. The position could be anywhere on the top or bottom of the plate that is “visible or within range” of an appropriate reader or visible to an operator to enter a plate identifier, for example a serial number into the system. The feature itself could comprise of a laser engraved serial number, barcode or QR code or be a sticker containing the same information. In the case where just a serial number is read or entered this serial number would need to pull all the unique information about that specific plate from a database. This information might include the exact XY Tilt of the plate, the XY Tilt Trim offsets of each aperture within the plate with respect to the reference surface 26, along with all the XYR coordinates of all the apertures and reference surface, along with the serial number.

In an aspect, plate 12 can be provided with a near field communication device, such as an RFID tag, for example, that is uniquely coded to the plate to facilitate retrieving the plate data, including XY Tilt of the plate, the XY Tilt Trim offsets of each aperture within the plate, along with all the XY and R (rotation) coordinates of all the apertures and reference surface—potentially eliminating the need for a separate database. In an aspect, RFID technology described in U.S. Pat. No. 9,014,528 could be used, and this patent and its disclosure are incorporated herein by reference in their entirety.

Figure 4A:
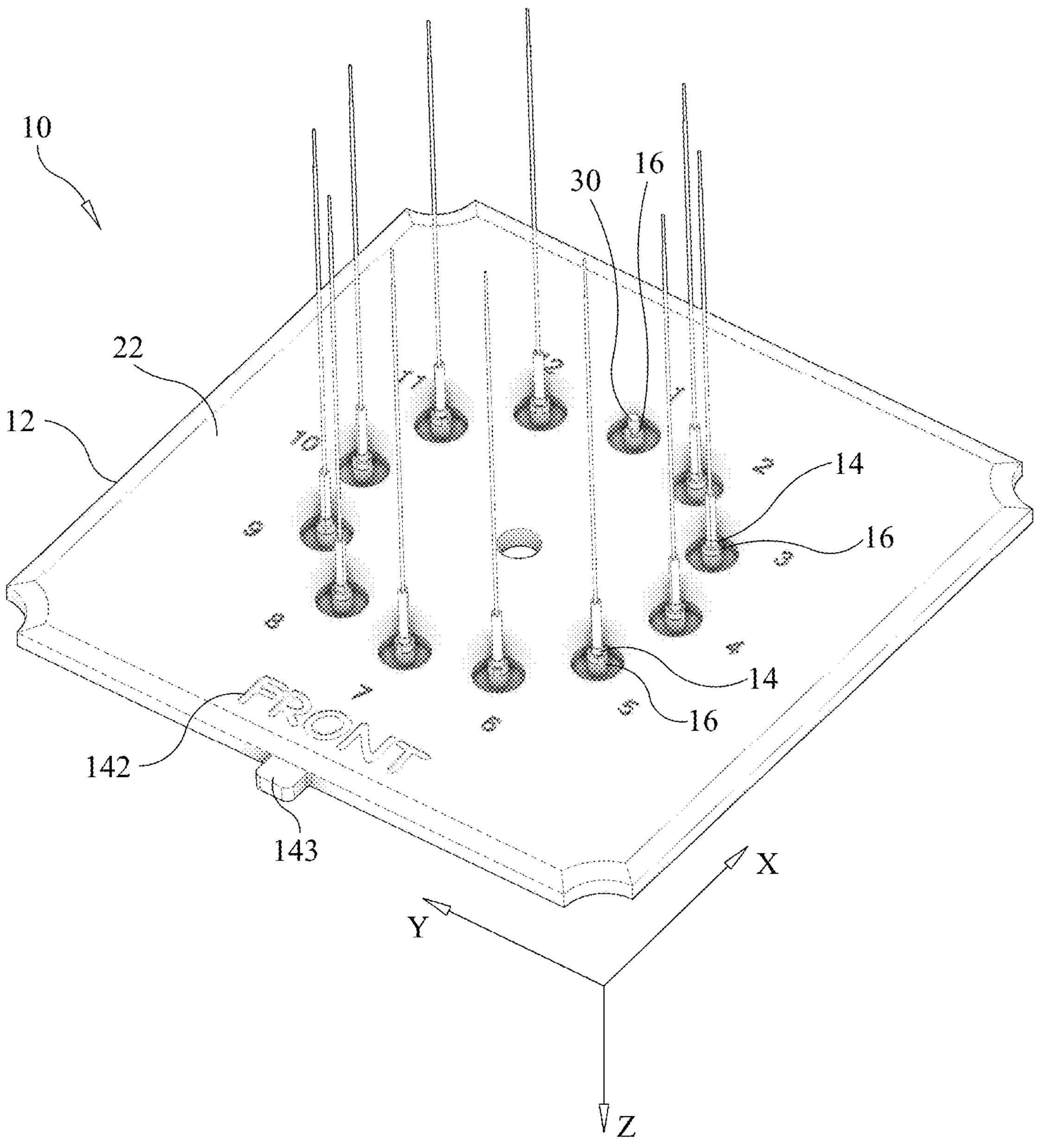
FIG. 4*a* is a top perspective view of an optical fiber ferrule polishing holder according to another embodiment of the invention.
Figure 4B:
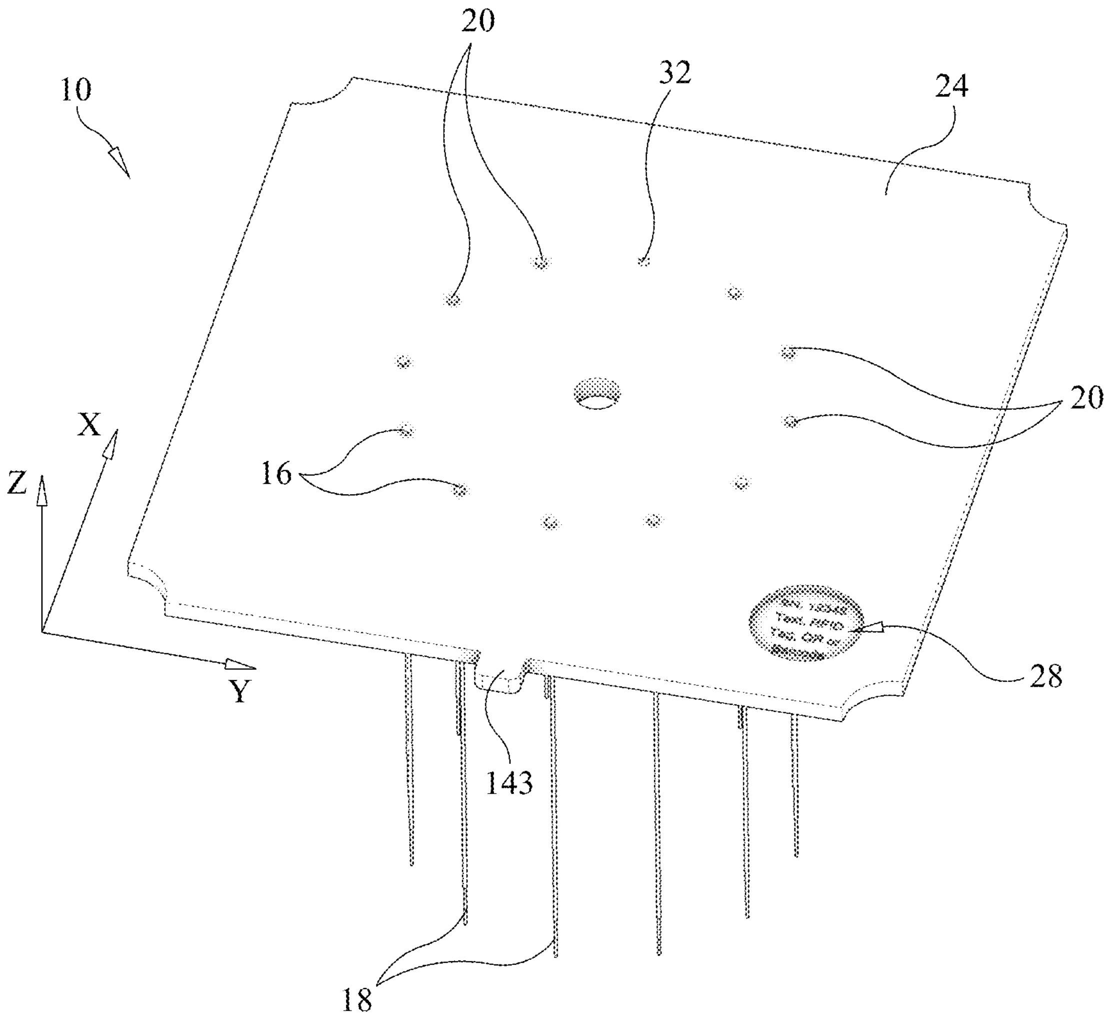
FIG. 4*b* is a bottom perspective view of an optical fiber ferrule polishing holder according to another embodiment of the invention.

FIGS. 4*a* and 4*b* show plate 10 with an alternative reference surface provided by a reference connector 30 that is permanently installed in one of the plurality of apertures 16. The reference connector 30 has an endface 32 of a known geometry and this endface provides the reference surface. Endface 32 is disposed slightly recessed from the plate bottom surface 24 so there is no possibility of contacting the abrasive polishing platen and becoming damaged or modified. This embodiment is particularly useful to enable the use of the tens or hundreds of thousands of legacy polishing plates that already exist worldwide without additional features to install a reference surface, thereby making them compatible with the systems and methods disclosed herein.

In an aspect, the reference surface could be a reference region on the plate bottom surface 24 itself. Although surface 24 does not typically contact the polishing platen because the ferrules to be polished protrude beyond this surface, it is still usually ground and lapped/polished to become a very flat surface. As such, it is a potential candidate for the reference surface, however, it is not preferred as this exposed surface is more susceptible to becoming damaged.

Figure 5:
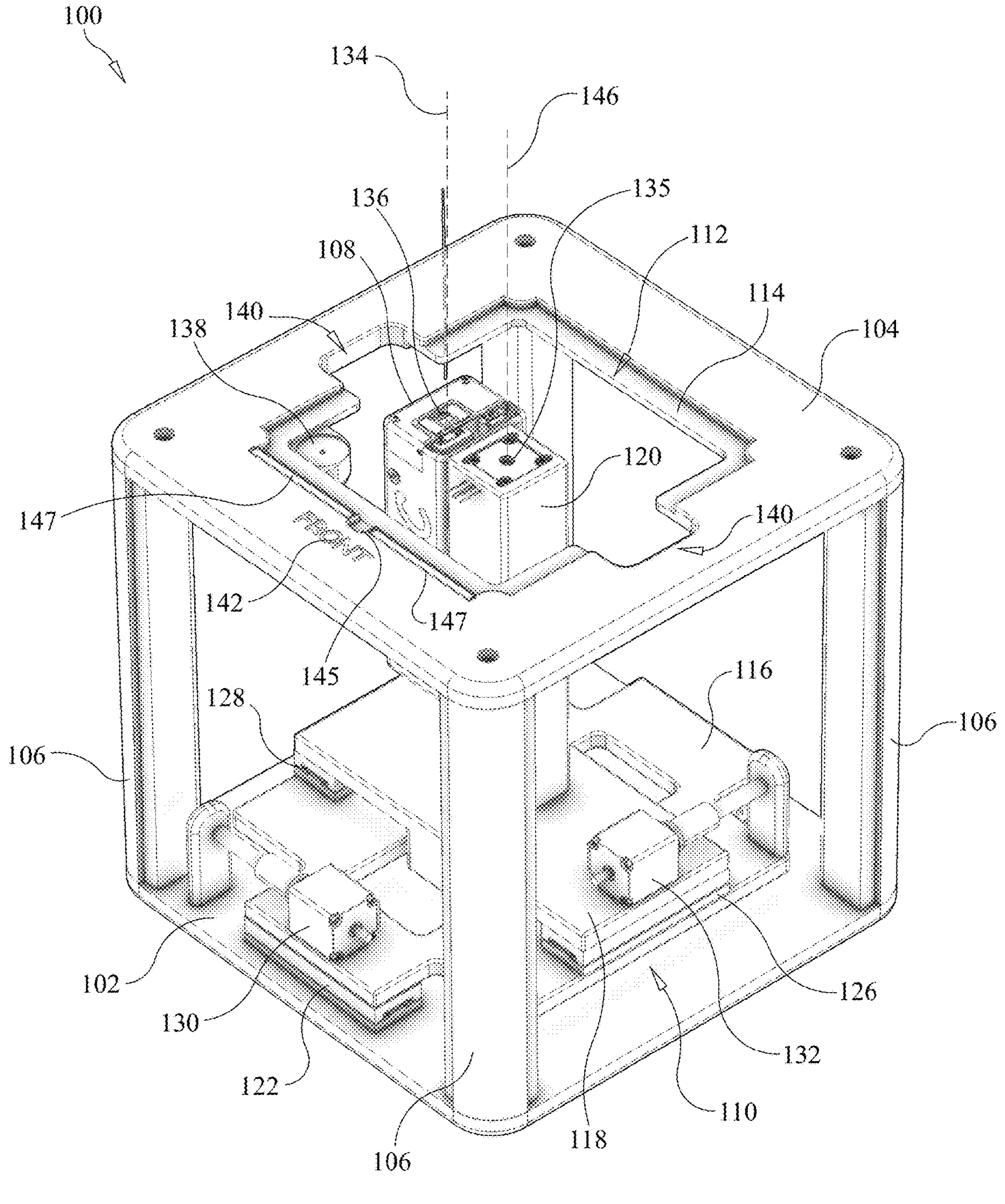
FIG. 5 is a first top perspective view of an apparatus for measuring optical fiber connector ferrule endfaces according to at least one embodiment of the invention.
Figure 6:
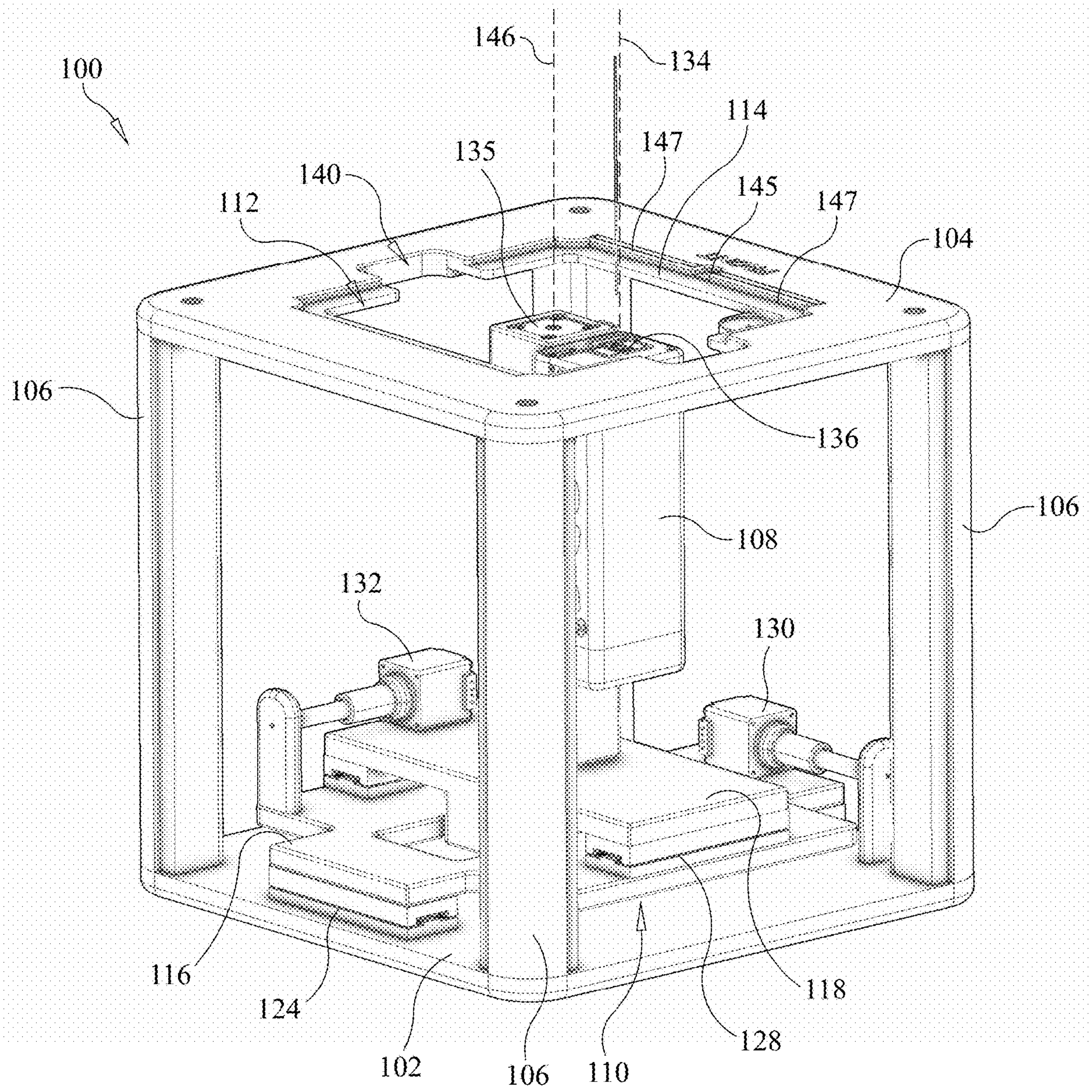
FIG. 6 is a second top perspective view of the apparatus.
Figure 7:
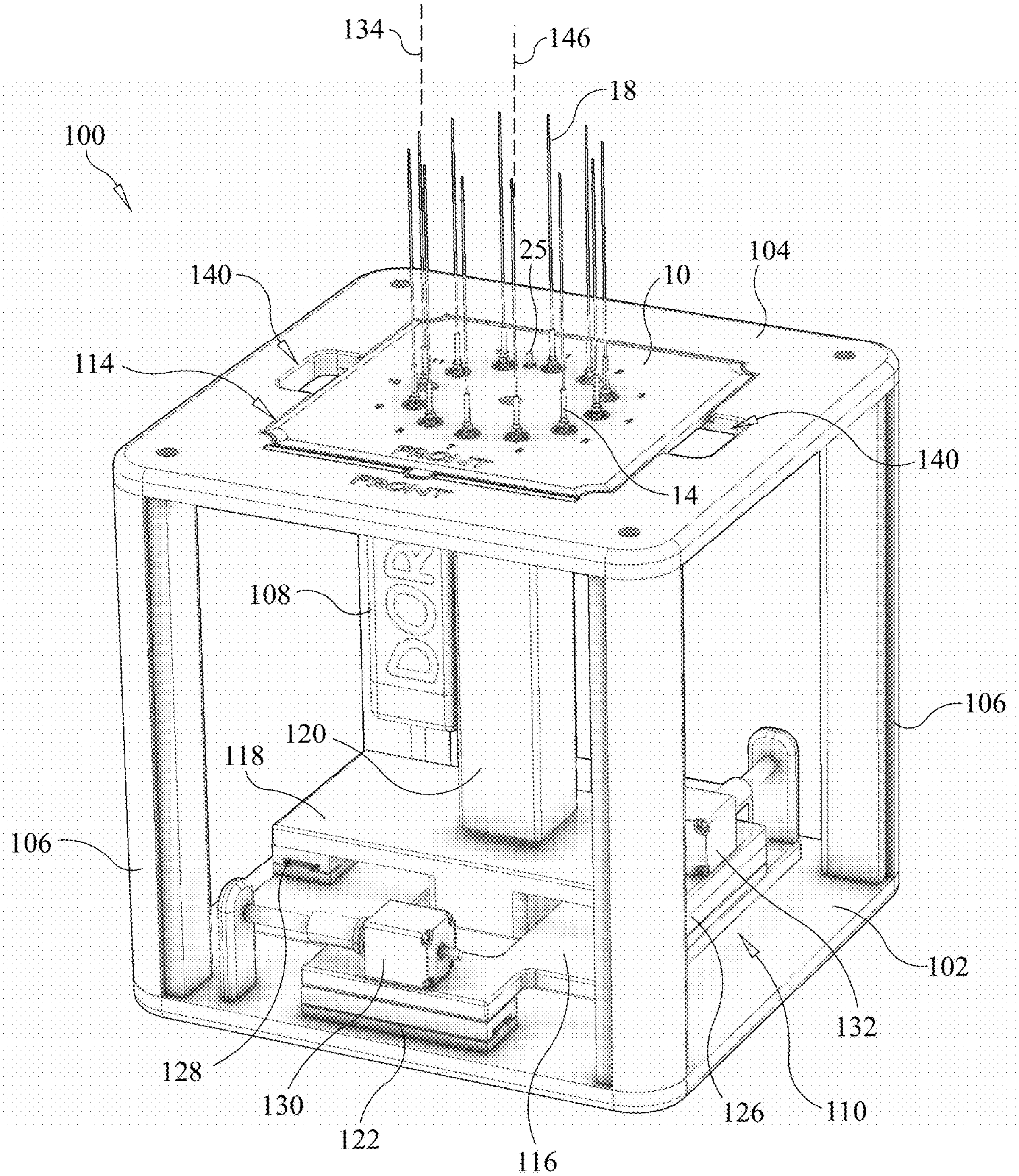
FIG. 7 is a top perspective view of the apparatus having an optical fiber ferrule polishing holder mounted thereto.
Figure 8:
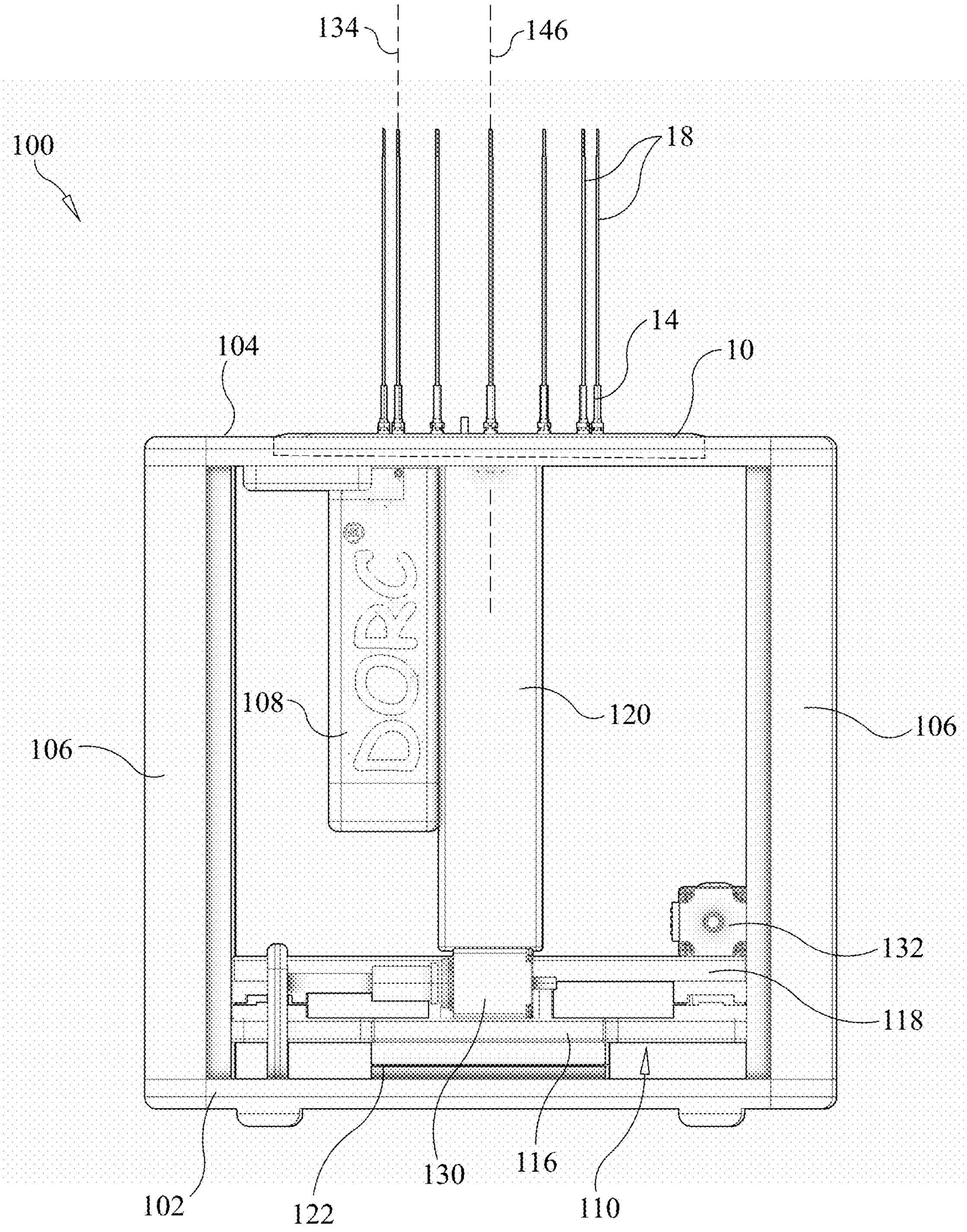
FIG. 8 is a front elevation view of an apparatus for measuring optical fiber connector ferrule endfaces according to at least one embodiment of the invention.
Figure 9:
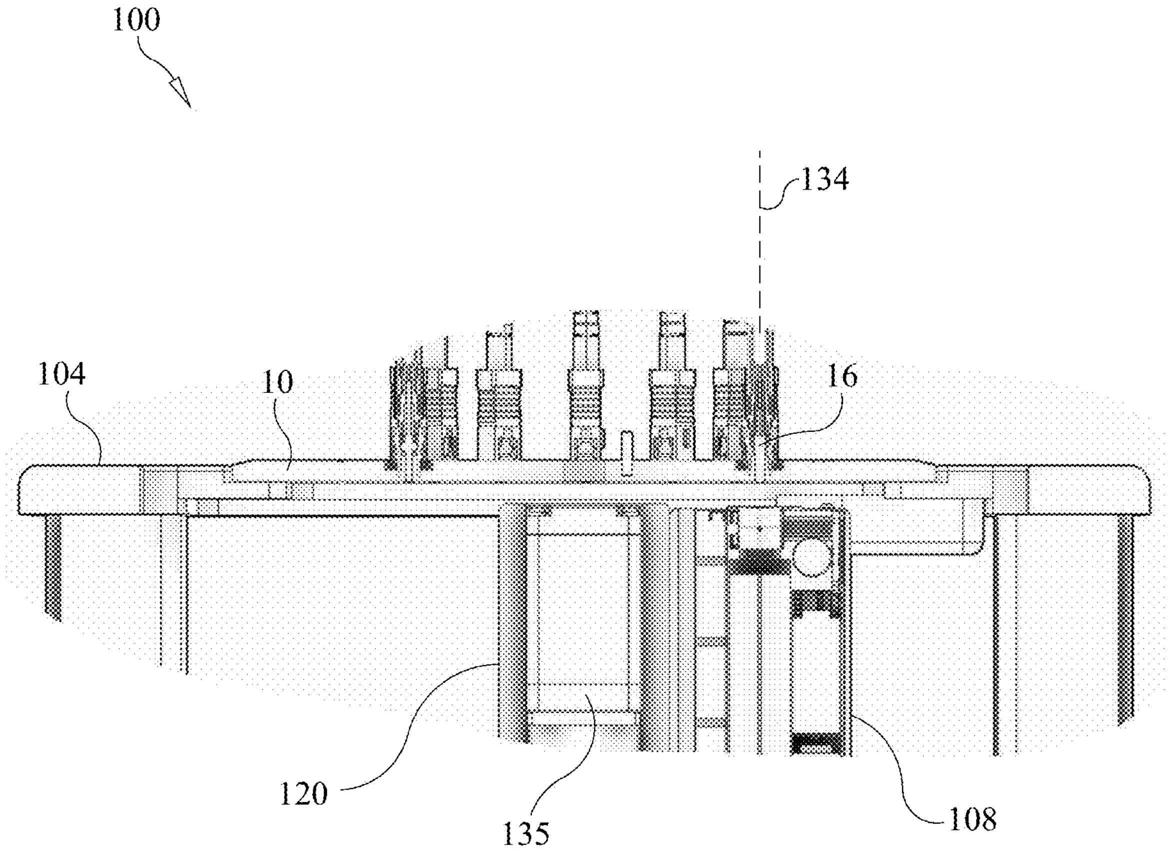
FIG. 9 is a front, partial cross-sectional view of an apparatus for measuring optical fiber connector ferrule endfaces according to at least one embodiment of the invention.

In FIGS. 5 and 6 there is shown an apparatus 100 that can be used in implementing the various aspects of the invention. Apparatus 100 can be used in initially measuring or determining the spatial geometry and orientation of the plate and the insertion apertures of a plate in accordance with the various aspects of the disclosure. Apparatus 100 can also be used in measuring the endfaces of fiber optical connectors while they remain attached to a polishing plate in accordance with the various aspects of the disclosure.

Apparatus 100 is shown without its outer casing for clarity. Apparatus 100 has a fixture having a bottom 102 and a top 104 that is supported at an elevated distance from the bottom by a plurality of supports 106, representatively arranged disposed at each corner. An interior space is provided between the bottom and top in which are disposed an optical imaging device 108 such as an interferometer and an imaging device positioning mechanism 110. Interferometer 108 may be a non-contact endface interferometer. The interferometer 108 can be configured to measure single fiber connectors, such as those representatively shown and discussed above, or multifiber connectors such as multifiber MT connectors. Non-contact optical fiber endface geometry measuring interferometers are known in the field and, accordingly, a complete description of their structure and operation is not necessary here. For example, reference can be made to U.S. Pat. No. 5,459,564, the entirety of which is incorporated herein, for a relevant discussion on endface geometry measuring interferometers devices, systems, and methods.

Top 104 defines an opening 112 that opens into the interior space. A recess 114 is disposed around the opening and is configured to removably receive and hold a polishing plate in alignment with opening 112 for measuring endfaces connected to the plate by the interferometer. Polishing plates and the recess have sufficiently tight dimensions and tolerances to ensure a sufficiently repeatable XY and rotation alignment when different polishing plates are installed.

The interferometer positioning mechanism 110 may have XY translating first and second platens 116 and 118, and a spindle 120. Platen 116 is attached to bottom 102 by a pair of spaced linear rails 122 and 124 and is movable in the Y direction. Platen 118 in turn is attached to platen 116 by a pair of spaced linear rails 126 and 128 and is movable in the X direction. Spindle 120 is vertically disposed and is attached to platen 118 and rotatable about a Z axis 146. A first linear actuator 130 is operably connected to platen 116 and is operated to move the platen back-and-forth along the Y direction. A second linear actuator 132 is operably connected to platen 118 and is operated to move the platen back-and-forth along the X direction. The linear actuators 130 and 132 may be high precision stepper motors, for example. A rotary actuator 135 is operably connected to the spindle 120 to rotate the spindle about the Z axis 146. The rotary actuator 134 may be a high precision stepper motor, for example.

Interferometer 108 is attached to the spindle 120 for conjoined movement therewith and with its optical viewing direction facing upwardly toward opening 112 and with its optical axis 134 generally parallel to the Z-axis 146 to intersect the bottom surface of a plate when received by the fixture. To this end, the interferometer 108 is movable in constrained X and Y directions relative to the top and ultimately to a polishing plate mounted to the fixture and is also rotatable about the Z-axis 146. These degrees of motion allow repeatable and precise positioning of the interferometer relative to the polishing plate and specifically to move the interferometer to each ferrule location on the polishing plate to measure its endface geometry.

Rotating the interferometer 108 about the Z-axis 146 is useful particularly when measuring the endface geometry of ACP connectors wherein the endface is polished at an angle. Being able to rotate the interferometer about the Z-axis 146 allows the image plane of the interferometer to align with the angled endface so that the endface of each ACP connector is presented in the same orientation for measuring. Further, the optical system 136 of the interferometer 108 may be movable up-and-down along its optical axis to focus on each ferrule endface during each measurement.

Fixture 100 may also have an RFID reader 138 that can be disposed near or mounted to the top 104 for reading an RFID tag disposed on a plate when the plate is mounted to the apparatus within recess 114, for example.

Top 104 may also have one or more notches 140 that can be formed along an edge of the opening 112 or recess 114, as shown, that permits a user to insert and remove a plate from the recess by inserting one or more fingers into the notches.

In FIGS. 7-10 there is shown an optical fiber ferrule polishing holder 10 mounted to the fixture of apparatus 100 in accordance with at least one embodiment of the disclosure. As shown, plate 10 is mounted or attached to the fixture by placement into recess 114 which holds the plate in position on the top of the fixture.

It is important for plate 10 to be positioned or mounted to the fixture in a correct rotational orientation about the Z-axis that corresponds to its initial rotational orientation when the spatial geometry of the plate was initially characterized. In aspects, to help a user with correctly orientating plate 10, the plate and the fixture can have corresponding markings 142, such as for example the word FRONT, that are to be aligned when mounting the plate to the fixture.

Figure 10:
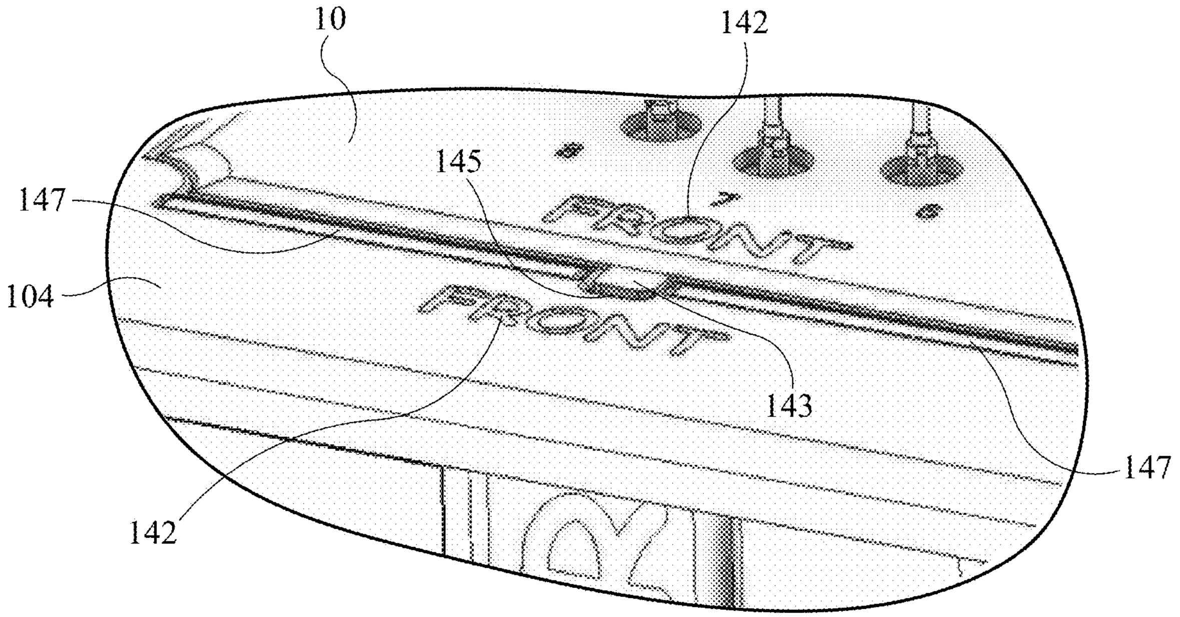
FIG. 10 is a partial enlarge view of an apparatus for measuring optical fiber connector ferrule endfaces according to at least one embodiment of the invention.

In aspects, a physical alignment feature may be provided that will only allow the plate to be mounted to the fixture in one rotational orientation relative to the fixture. A physical alignment feature may include corresponding surfaces or shapes of a portion of the fixture and of the plate so that the corresponding surfaces or shapes must be cooperatively aligned to allow the plate to be mounted to the fixture. As best seen in FIG. 10, in the representatively shown embodiment, a physical alignment feature may include a tab 143 that extends from an edge of plate 10 and a corresponding notch 145 that is formed into the top 104. The tab 143 and the notch 145 must be aligned to insert plate 10 into recess 114, thereby ensuring the same, correct orientation each time the plate is mounted to the fixture. It should be appreciated that different structures could be provided as an alignment feature, and the illustrative feature should not be considered limiting unless otherwise stated.

In aspects, it may be desirable to physically bias plate 10 in a particular direction when the plate is mounted to the fixture to further ensure repeatable, accurate alignment. Such may be the case to compensate for dimensional tolerance differences between plates and the opening 112 in the top 104, for example. In aspects, it may be desirable to bias plate 10 in a particular XY direction in the opening 112 so that the plate is always positioned in the same XY location in the opening.

In the representatively shown embodiment, one or more magnets 147 may be provided and disposed in a desired location on the fixture to bias a plate 10, constructed of a ferrous material, in a particular direction in the opening 112. As shown, one or more magnets 147 could be located at an edge of the opening 112 such that when plate 10 is received in the opening the magnetic force between the magnets 147 and the plate cause the plate to be pulled toward the magnets, thereby biasing the plate in a direction toward the magnets when the plate is received in the opening. As shown, one or more magnets 147 could be located on opposite sides of notch 145. It should be appreciated that different structures could be provided as a plate biasing feature and the illustrative feature should not be considered limiting unless otherwise stated.

Further, while the opening 112 and recess 114 are representatively shown as being square-shaped, they may have other shapes. There are numerous manufacturers of polishing machines leading to many polishing plate designs having different shapes and sizes. To accommodate these different plate shapes and sizes, the top 104 can be easily changed by the user. Since the polishing plate XY Tilt orientation is determined using the reference surface on the polishing plate itself before the measurement of the connectors in each plate, no alignment, adjustment, or recalibration is required when installing different top plates. Additionally, any dirt, debris or contamination accumulating on recess 114 that could prevent the plate from seating fully, and thereby at a slight XY Tilt angle will have no effect whatsoever on the accuracy of the measured endface geometry results.

Figure 11:
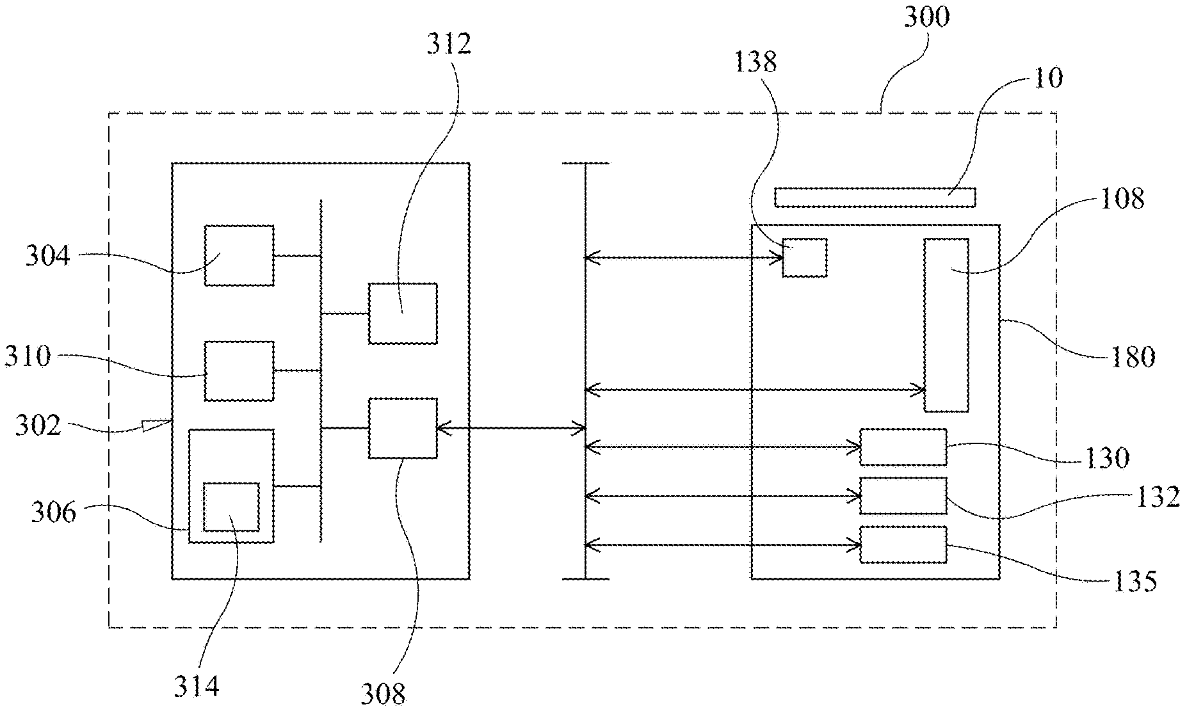
FIG. 11 is a block diagram of a system in accordance with an embodiment of the invention.

In FIG. 11 there is a block diagram of a system 300 in accordance with an embodiment of the disclosure. System 300 includes apparatus 100 and plate 10, both simply diagrammatically shown and may have a computing system 302 for implementing embodiments of the disclosure. The computing system 302 may include several components, such as a central processing unit (CPU) 304, a memory 306, an input/output (I/O) device(s) 308, a nonvolatile storage device 310, and a database 312. Computing system 302 can be implemented in various ways. For example, an integrated platform (such as a workstation, personal computer, laptop, etc.) may comprise CPU 304, memory 306, nonvolatile storage 310, and I/O devices 308. In such a configuration, components 304, 302, 306, and 308 may connect through a local bus interface and access database 312 via an external connection. This connection may be implemented through a direct communication link, a local area network (LAN), a wide area network (WAN) and/or other suitable connections. In some embodiments, database 312 may be an embedded database, such that components 304, 302, 306, and 308 may access database 312 through a retrieval library (not shown). In aspects, database 312 may be used to store polishing plate characterization or spatial data. The characterization or spatial data can be stored in database 312 during the initial characterization process. The characterization or spatial data can be stored in database 312 for retrieval and use for measuring enface geometry. In aspects, database 312 may be stored on a near field communication device, including an RFID tag. In aspects, database 312 may include data stored on a near field communication device, including an RFID tag and one or more other databases.

CPU 304 may be one or more known processing devices. It is contemplated that CPU 304 may include any microprocessor employing 32-bit or 64-bit architecture. Memory 306 may be one or more storage devices configured to store information used by CPU 304 to perform certain functions related to embodiments of the present application. Storage 310 may be a volatile or nonvolatile, magnetic, semiconductor, tape, optical, removable, non-removable, or other type of storage device or computer-readable medium. In one embodiment consistent with the invention, memory 306 includes one or more programs or subprograms loaded from storage 310 or elsewhere that, when executed by CPU 304, perform various procedures, operations, or processes consistent with the present disclosure.

Methods, systems, and articles of manufacture consistent with the present application are not limited to separate programs or computers configured to perform dedicated tasks. For example, memory 306 may be configured with a program 314 that performs several functions when executed by CPU 304. For example, memory 306 may include a single program 314 that performs the functions of any process of the present application. Moreover, CPU 304 may execute one or more programs located remotely from system 302. For example, system 302 may access one or more remote programs that, when executed, perform functions related to embodiments of the present application.

Memory 306 may also be configured with an operating system (not shown) that performs several functions well known in the art when executed by CPU 304. The choice of operating system, and even the use of an operating system, is not critical to the invention.

I/O device(s) 308 may comprise one or more input/output devices that allow data to be received and/or transmitted by system 302. For example, I/O device 308 may include one or more input devices, such as a keyboard, touch screen, mouse, and the like, that enable data to be input from a member, such as concept information, status labels, database identifiers, etc. Further, I/O device 308 may include one or more output devices, such as a display screen, CRT monitor, LCD monitor, plasma display, printer, speaker devices, and the like, that enable data to be output or presented to a member. I/O device 308 may also include one or more digital and/or analog communication input/output devices that allow computing system 302 to communicate with other machines and devices. System 302 may input data from external machines and devices and output data to external machines and devices via I/O device 308.

System 302 may communicate with apparatus 100 via I/O device 308 to send and/or receive video, information, data, and operational instructions to the various components of the apparatus. As shown, the interferometer 108, the linear actuators 130 and 132, the rotary actuator, and the RFID reader 138 are all connected for communication with the computer system by I/O 308. The configuration and number of input and/or output devices incorporated in I/O device 308 are not critical to the invention.

Initial Polishing Plate Characterization

In an aspect, the reference surface of the polishing plate is used to initially measure or determine the spatial geometry of the plate and all its apertures. In an aspect, an interferometer and a polishing plate are positioned relative to each other in such a way that the interferometer can physically view and focus on the polishing plate reference surface and the regions of interest nominally centered on all the connector holding apertures in the plate that are used to hold the connectors during polishing. This initial characterization or measurement of the polishing plate can be conducted with apparatus 100.

Since the field of view of the interferometer is much smaller than the size of the polishing plate (to achieve sufficient optical resolution), this typically involves precise motion of either the interferometer and/or the polishing plate relative to each other in the XYZ and optionally rotational (R) axis. It is very important that this motion be constrained to these axes and not impart any change in the XY tilt axis between the interferometer and the polishing plate when XYZ and Rotation axis are adjusted. The mechanical design of the structure supporting the interferometer and the polishing plate is such that the nominal XY tilt axis of the polishing plate relative to the XY tilt axis of the interferometer's reference mirror is nominally the same. Doing this ensures that the angular offsets being measured to characterize the polishing plate are well within the measurement range of the interferometer. Despite the nominal alignment between the interferometer and the polishing plate being similar, it is not close enough to make accurate 3D geometry measurements of the connector endfaces without the trim calibration information gained by this characterization of the polishing plate.

The polishing plate reference surface is measured by the interferometer, such that the current XY tilts of the polishing plate reference surface can be extracted and saved. In the preferred embodiment of the invention a perfectly flat surface is used as the initial polishing plate reference surface, regardless of whether it is a mirror recessed into the polishing plate, a polished ferrule permanently inserted into one of the polishing apertures or a portion of the bottom surface of the polishing plate. While one or more of the foregoing described reference surfaces are preferred, any fixed surface with a known XY tilt on a polishing plate could be used as a polishing plate reference surface such as a radius or spherical shape, to achieve the same goal of extracting the orientation of the polishing plate and thereby its connector holding apertures without departing from the spirit and scope of the disclosure.

The interferometer and/or the polishing plate are moved relative to each other by adjusting XYZ and Rotation as necessary, such that the interferometer's field of view is now nominally centered on the first aperture in the polishing plate to be characterized. A temporary reference connector surface is inserted into this aperture and measured by the interferometer, such that the XY tilts of this reference surface can be extracted and saved. In the preferred embodiment of the invention a perfectly flat polished ferrule is used as the reference connector surface and in this case the exact XY tilt angles of the aperture can be extracted directly.

In aspects, any known surface or even an unknown surface that is rotated in the connector aperture and measured multiple times could be used as a reference connector surface such as a radius or spherical shape, to achieve the same goal of extracting the XY tilt orientation of the polishing plate or each of its connector holding apertures without departing from the spirit and scope of the disclosure. In the case of APC polishing plates, a temporary reference surface would need to be angled at the same nominal angle of the bore (typically 8 degrees) and rotationally keyed to match the polishing plate aperture orientation.

The measurement process is repeated for all the remaining connector holding apertures in the polishing plate. Once completed, an array of data will exist characterizing the exact XY tilt trim value of every connector holding aperture in the polishing plate relative to the initial XY tilt of the polishing plate reference surface.

The locations of each connector holding aperture are typically but not always at a constant radial distance from the center of the polishing plate, however, machining tolerances can mean that they may be 10's to 100's of microns away laterally in the XY axis from their expected location. Since the aperture and the reference surface lateral locations never change and have already been accurately located during characterization, these "XY Location Offset Trim" values are also saved along with all the tilt calibration data in a database for later retrieval during a measurement operation. Having this information available in advance prevents the system from having to find the exact XY locations during regular measurements.

The characterization or spatial data for each polishing plate is unique to that specific polishing plate, and as such the polishing plate serial number and the associated XY Tilt values for the initial polishing plate reference surface at the time of characterization and XY Tilt Trim Values of every connector holding aperture in the polishing plate relative to the initial reference surface need to be related to each other. The easiest way to do this is to simply consider the polishing plate reference surface to be X tilt=0.000 degrees and Y tilt=0.000 degrees. Each connector holding aperture will then have its own XY Tilt Trim Value, for example Aperture Position #1-X tilt=−0.0433 degrees, Y tilt=+0.0367 degrees, Aperture Position #2-X tilt=+0.0586 degrees, Y tilt=−0.2196 degrees, and so on. All the characterization or spatial data is then saved in a database to be retrieved later during measurement operations.

Any previously characterized polishing plate can be presented to the interferometer in an unknown XY Tilt orientation and the 3D endface geometry of connectors in every aperture of the plate can be measured as accurately as if the connectors were individually inserted into a fixture rigidly attached to the interferometer itself.

The specific polishing plate holding the connector ferrules must be known and identified as the plate currently in view of the interferometer. This can be established by incorporating an RFID tag into or mounted on the polishing plate to store the previously characterized calibration and location data, as discussed above. Alternatively, as discussed above, a serial number or specific information on the polishing plates characteristics could be obtained by reading Bar/QR codes or laser engraving, using readers or machine vision. If just a serial number was used, it would then need to be tied to a database containing the characterization or spatial data unique to that polishing plate.

Connector Endface Measurement

The following explains one example way to measure the endfaces of connectors while remaining attached to a polishing plate in accordance with the disclosure. A polishing plate that has had its spatial geometry previously characterized and has that data stored in a database for retrieval during measuring measurement is used to polish a plurality of connectors using conventional polishing procedures. Following polishing, the polishing plate containing the polished connectors is removed from the polishing machine. If necessary, the connector endfaces are cleaned using known cleaning methods without removing the connectors from the polishing plate.

The polishing plate is installed on the apparatus in a predetermined rotational orientation such that if the plate is fitted with an RFID tag, the RFID tag is aligned with the RFID reader, which reads the RFID tag to automatically retrieve the plate characterization data for use during measuring the attached connectors. Alternatively, the plate characterization or spatial data can be manually retrieved by knowing the unique plate identification as described above, for example.

Using the characterization or spatial data unique to this polishing plate, the interferometer is caused to automatically move in XY and rotation to the lateral XY and radial R coordinates of the reference surface. The interferometer will then automatically initiate a measurement of the reference surface after auto focusing. The XY Tilt angles of the reference surface are extracted from this interferometric data. At this point, the previously unknown XY Tilt orientation of the polishing plate, relative to the interferometers optical axis is now known accurately.

For this example, we will assume the reference surface measured X tilt=+0.5500 degrees and Y tilt=+0.6500 degrees. If these numbers are large (as in this example), the interferometer can automatically move its internal reference mirror to "null" the reference surface—relative to "the new adjusted" interferometer's optical axis and remeasure the reference surface. We will assume the new residual measured X tilt=+0.0550 degrees and Y tilt=+0.0650 degrees. Not quite perfect, but now the visual interferometric image will look correct from an operator's perspective, and the small residual reference surface XY tilt error can be accommodated in software—as further calculations are performed.

Using the characterization data unique to this polishing plate, the interferometer automatically moves in XY and rotation to the lateral (XY) and radial (R) coordinates of Aperture Position #1, considering any XY location offset trim values to accommodate machining tolerances in the polishing plate manufacturing process. The interferometer will then automatically initiate a 3-Dimensional (3D) and 2-Dimensional (2D) measurement of the ferrule endface after auto focusing to determine both the shape of the endface and perform visual inspection/scratch analysis. The 3D geometry of the ferrule endface at this stage is correct, however, its optical axis still contains 2 errors that must be compensated for to calculate the correct ferrule endface angles and apex offset. These errors are the small residual reference surface XY tilt error (X tilt=+0.0550 degrees and Y tilt=+0.0650 degrees) and Aperture Position #1 "X and Y Tilt Trim from Reference Values" (X tilt=−0.0433 degrees and Y tilt=+0.0367 degrees). These errors are combined for each axis (X=+0.0550−0.0433=+0.0117 degrees & Y=+0.0650+0.0367=+0.1017 degrees), and then added/subtracted from the measured 3D geometry XY Tilt axis to obtain the correct calibrated endface geometry angles and apex offset—despite the fact that the polishing plate started with an unknown relationship with respect to the interferometer and each ferrule aperture position within the polishing plate is at a slightly different XY Tilt angle.

Once all measurements for each enface have been completed, connectors passing endface geometry testing can be removed for additional assembly and optical testing. Failing connectors can be left in the polishing plate and returned to the polishing station for repolishing without ever having been removed. Despite the number of steps involved, the process can be fully automated, and all measurements can be completed in just a couple of minutes, which is considerably faster than conventional methods that involve removing connectors from the polishing plate to perform the interferometric and inspection testing.

While the foregoing disclosure and the various embodiments disclosed herein are made in relation to single fiber connectors such as PC and APC connectors, it is important to note that the disclosure and embodiments can be adapted to MT fiber optic connectors wherein each connector has multiple fibers and respective endfaces.

While the disclosure has been illustrated and described in detail in the drawings and foregoing description, such illustration and description are to be considered exemplary and not restrictive in character, it being understood that illustrative embodiments have been shown and described and that all changes and modifications that come within the spirit of the disclosure are desired to be protected. It will be noted that alternative embodiments of the present disclosure may not include all the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An optical fiber ferrule polishing plate, comprising:

a plate-shaped body having a top surface and an opposing bottom surface spaced apart by a thickness, the-plate shaped body having an outer periphery and including a plurality of insertion apertures extending through the plate-shaped body between the top and bottom surfaces and located inward of the outer periphery;

each insertion aperture being configured to removably hold a fiber optic ferrule for polishing;

a reference surface disposed on the plate-shaped body in a location to be imaged by an optical imaging device to determine an XY tilt of the reference surface in relation to an optical axis of the imaging device, the reference surface remaining disposed on the plate-shaped body and maintaining a fixed spatial relationship relative to the plurality of insertion apertures during transfer of the plate-shaped body between a polishing and a interferometric measurement operation; and wherein at least two of the plurality of insertion apertures have a permanent and different XY aperture tilt relative to a Z-axis that is normal to the reference surface.

2. The optical fiber ferrule polishing plate of claim 1, wherein the reference surface is a mirrored surface.

3. The optical fiber ferrule polishing plate of claim 1, further comprising:

a reference ferrule attached to the body and having a reference ferrule endface recessed relative to the bottom surface, wherein the reference ferrule endface provides the reference surface.

4. The optical fiber ferrule polishing plate of claim 1, further comprising:

a radio-frequency identification (RFID) tag disposed on the body.

5. An optical fiber system comprising:

an optical fiber ferrule polishing plate having a top surface and an opposing bottom surface spaced apart by a thickness, the plate-shaped body having an outer periphery and including a plurality of insertion apertures extending through the plate-shaped body between the top and bottom surfaces and located inward of the outer periphery; each insertion aperture being configured to removably hold a fiber optic ferrule for polishing; a reference surface disposed on the body in a location to be imaged by an optical imaging device to determine an XY tilt of the reference surface in relation to an optical axis of the imaging device, the reference surface remaining disposed on the plate-shaped body and maintaining a fixed spatial relationship relative to the plurality of insertion apertures during transfer of the plate-shaped body between a polishing and a interferometric measurement operation; and wherein at least two of the plurality of insertion apertures have a permanent and different XY aperture tilt relative to a Z-axis that is normal to the reference surface;

a database storing spatial data of the at least one optical fiber ferrule polishing plate, the spatial data including XY reference tilt data of the reference surface and XY aperture tilt data of at least one of the plurality of apertures, the XY reference tilt data includes the XY tilt of the reference surface in relation to a first Z-axis extending through the bottom surface, and the XY aperture tilt data includes the XY tilt of the associated aperture in relation to a second Z-axis extending perpendicular to the reference surface; and whereby the spatial data of the at least one optical fiber ferrule polishing plate can be retrieved for measuring at least one endface of a fiber optic ferrule held by the optical fiber ferrule polishing plate.

6. The optical fiber system of claim 5, wherein the reference surface is a mirrored surface.

7. The optical fiber system of claim 5, further comprising:

a reference ferrule attached to the body and having a reference ferrule endface recessed relative to the bottom surface, wherein the reference ferrule endface provides the reference surface.

8. The optical fiber system of claim 5, further comprising an identifier disposed on the body and wherein the identifier is used to retrieve the characterization data from the database.

9. The optical fiber system of claim 5, further comprising an RFID tag disposed on the body, and wherein the RFID tag is used to retrieve the characterization data from the database.

10. The optical fiber system of claim 5, further comprising:

an interferometer having an optical axis, the interferometer being disposed relative to the body such that the optical axis intersects the bottom surface.

11. The optical fiber system of claim 5, wherein the database is a computer database.

12. An optical fiber system comprising:

an optical fiber ferrule polishing plate having a plate-shaped body having a top surface and an opposing bottom surface spaced apart by a thickness, the plate-shaped body having an outer periphery and including a plurality of insertion apertures extending through the plate-shaped body between the top and bottom surfaces and located inward of the continuous outer periphery; each insertion aperture being configured to removably hold a fiber optic ferrule for polishing; a reference surface disposed on the body in a location to be imaged by an optical imaging device to determine an XY tilt of the reference surface in relation to an optical axis of the imaging device, the reference surface remaining disposed on the plate-shaped body and maintaining a fixed spatial relationship relative to the plurality of insertion apertures during transfer of the plate-shaped body between a polishing and a interferometric measurement operation; and wherein at least two of the plurality of insertion apertures have a permanent and different XY aperture tilt relative to a Z-axis that is normal to the reference surface;

a fixture, the fixture configured to removably hold the optical fiber ferrule polishing plate, the fixture having a Z-axis that extends through the bottom of the body when the optical fiber ferrule polishing holder is held by the fixture; and an optical imaging device mounted to the fixture for movement relative to the plate-shaped body when the plate-shaped body is held by the fixture, and the optical imaging device having an optical axis that intersects the bottom surface of the body when the optical fiber ferrule polishing plate is held by the fixture.

13. The optical fiber system of claim 12, wherein the optical imaging device is mounted for rotation about the Z-axis.

14. The optical fiber system of claim 12, further comprising:

a database storing characterization data of the at least one optical fiber ferrule polishing plate, the characterization data including XY reference tilt data of the reference surface and XY aperture tilt data of at least one of the plurality of apertures, the XY reference tilt data includes the XY tilt of the reference surface in relation to a first Z-axis extend through the bottom surface, and the XY aperture tilt data includes the XY tilt of the associated aperture in relation to a second Z-axis extending perpendicular to the reference surface; and whereby the characterization data of the at least one optical fiber ferrule polishing plate can be retrieved for measuring at least one endface of a fiber optic ferrule held by the optical fiber ferrule polishing plate.

15. The optical fiber system of claim 14, wherein the database is a computer database.

16. The optical fiber system of claim 14, wherein at least one optical fiber ferrule polishing plate further has an RFID tag disposed on the body, and wherein the RFID tag is used to retrieve the characterization data from the database.

17. The optical fiber system of claim 14, wherein at least one optical fiber ferrule polishing plate further has an identifier disposed on the body and wherein the identifier is used to retrieve the characterization data from the database.

18. The optical fiber system of claim 12, wherein the reference surface of at least one optical fiber ferrule polishing plate is a mirrored surface.

19. The optical fiber system of claim 12, wherein at least one optical fiber ferrule polishing plate further has a reference ferrule attached to the body and having a reference ferrule endface recessed relative to the bottom surface, wherein the reference ferrule endface provides the reference surface.

20. The optical fiber system of claim 12, wherein the optical imaging device is an interferometer.

* * * * *